Aug. 8, 1939. A. W. FRENCH 2,169,184
GRADING AND EXCAVATING MACHINE
Filed Aug. 20, 1936 10 Sheets-Sheet 4
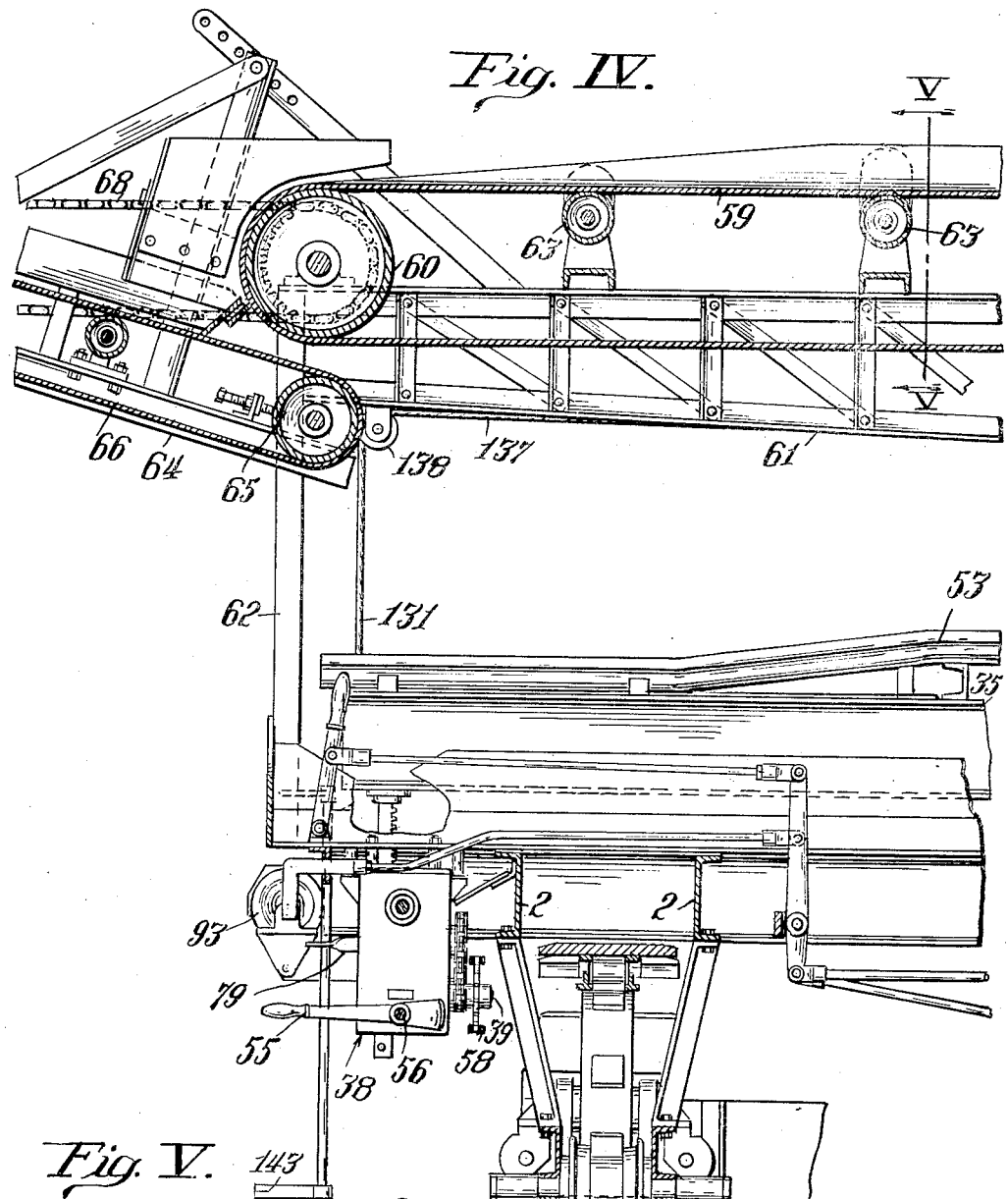
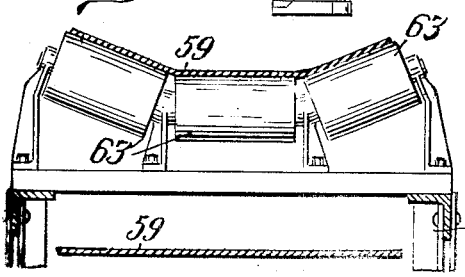

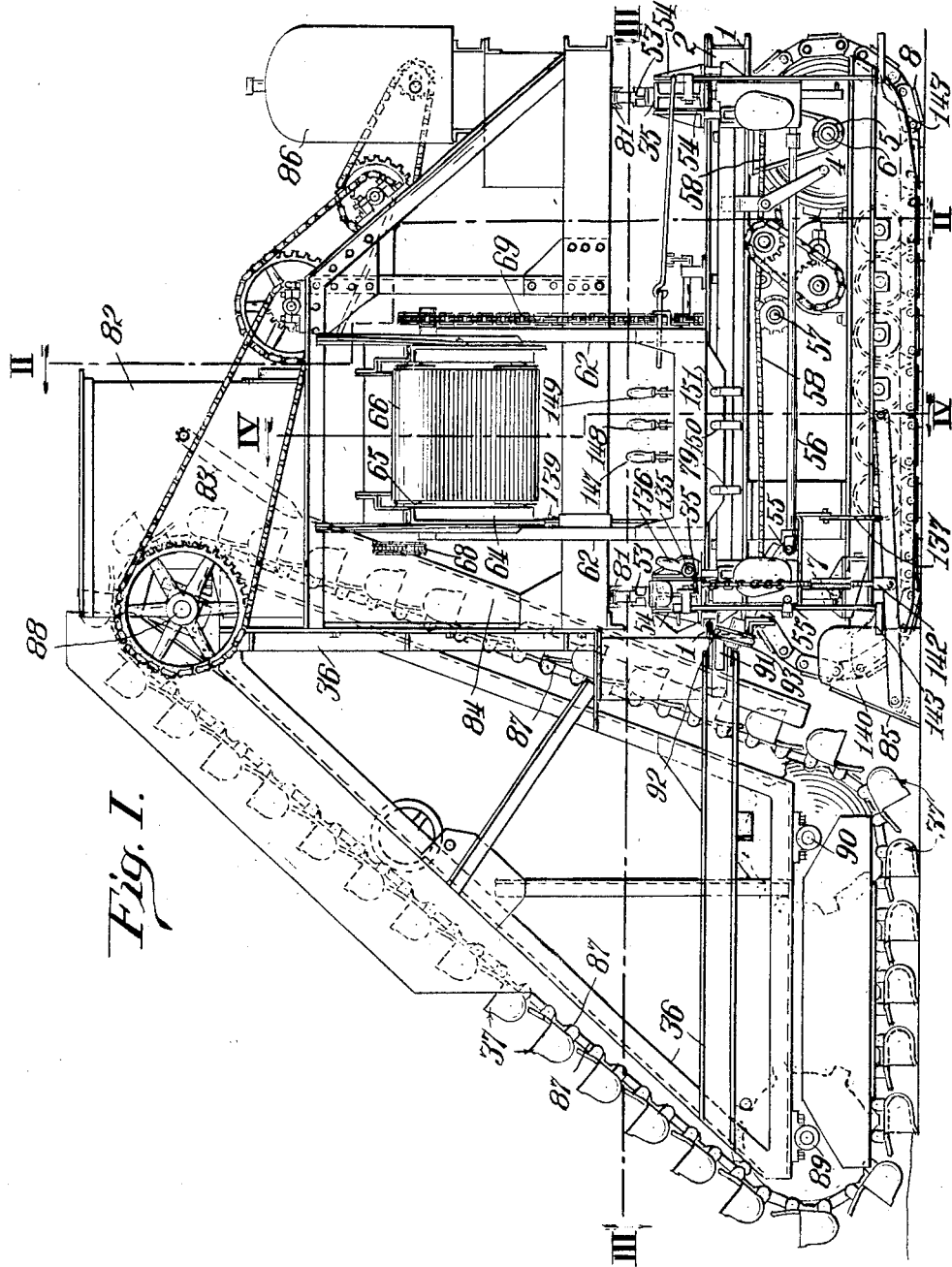

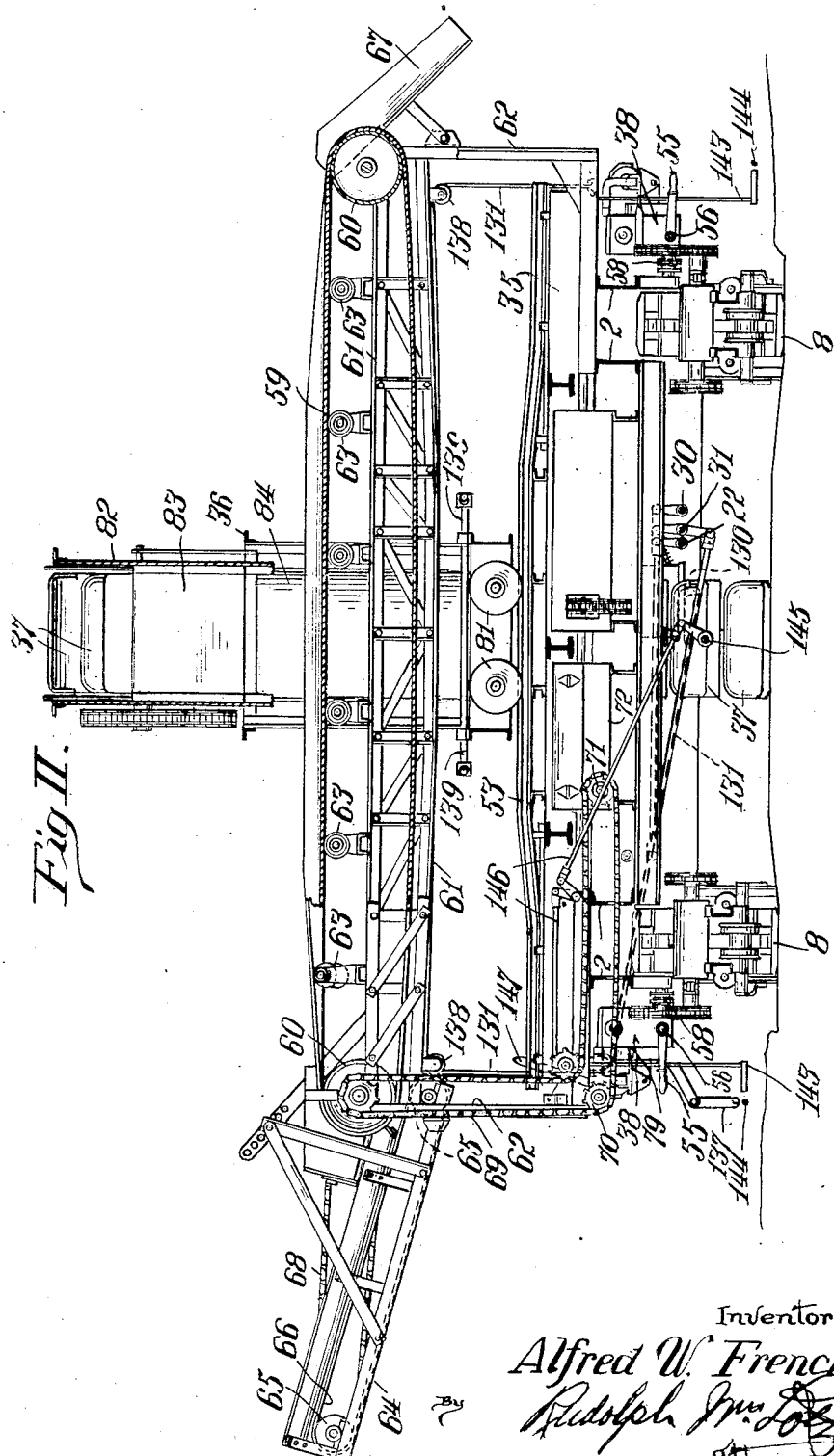

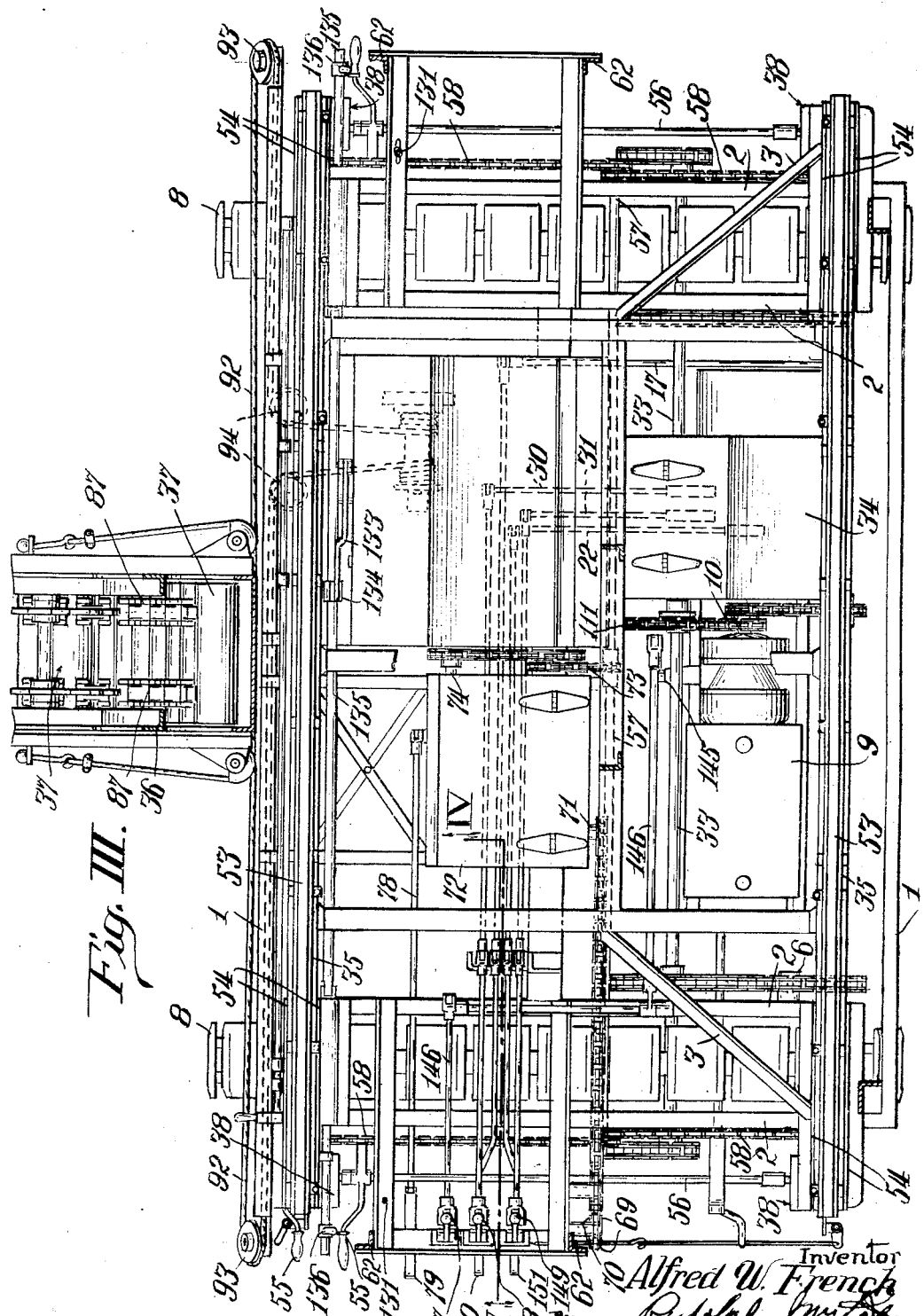

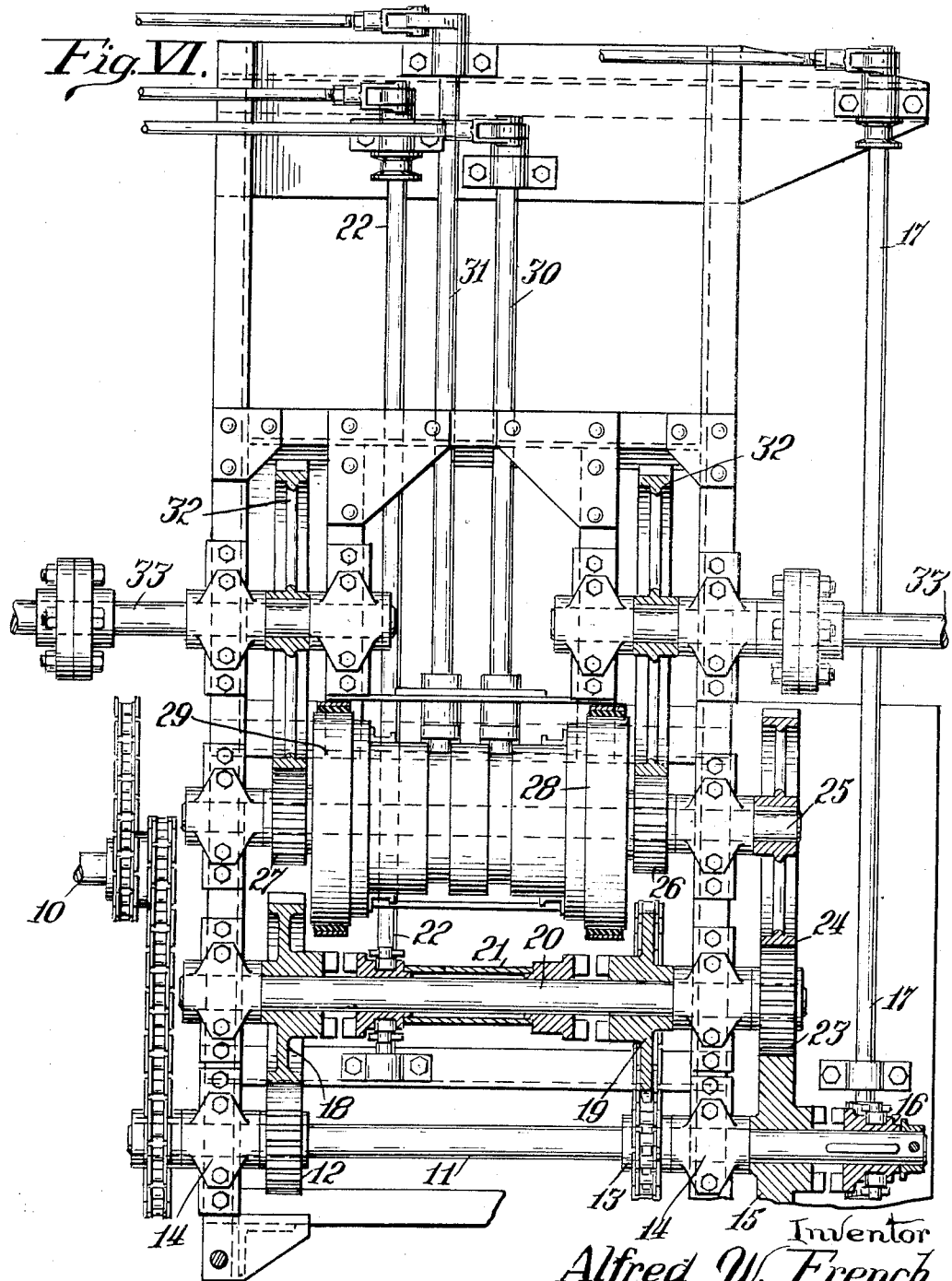

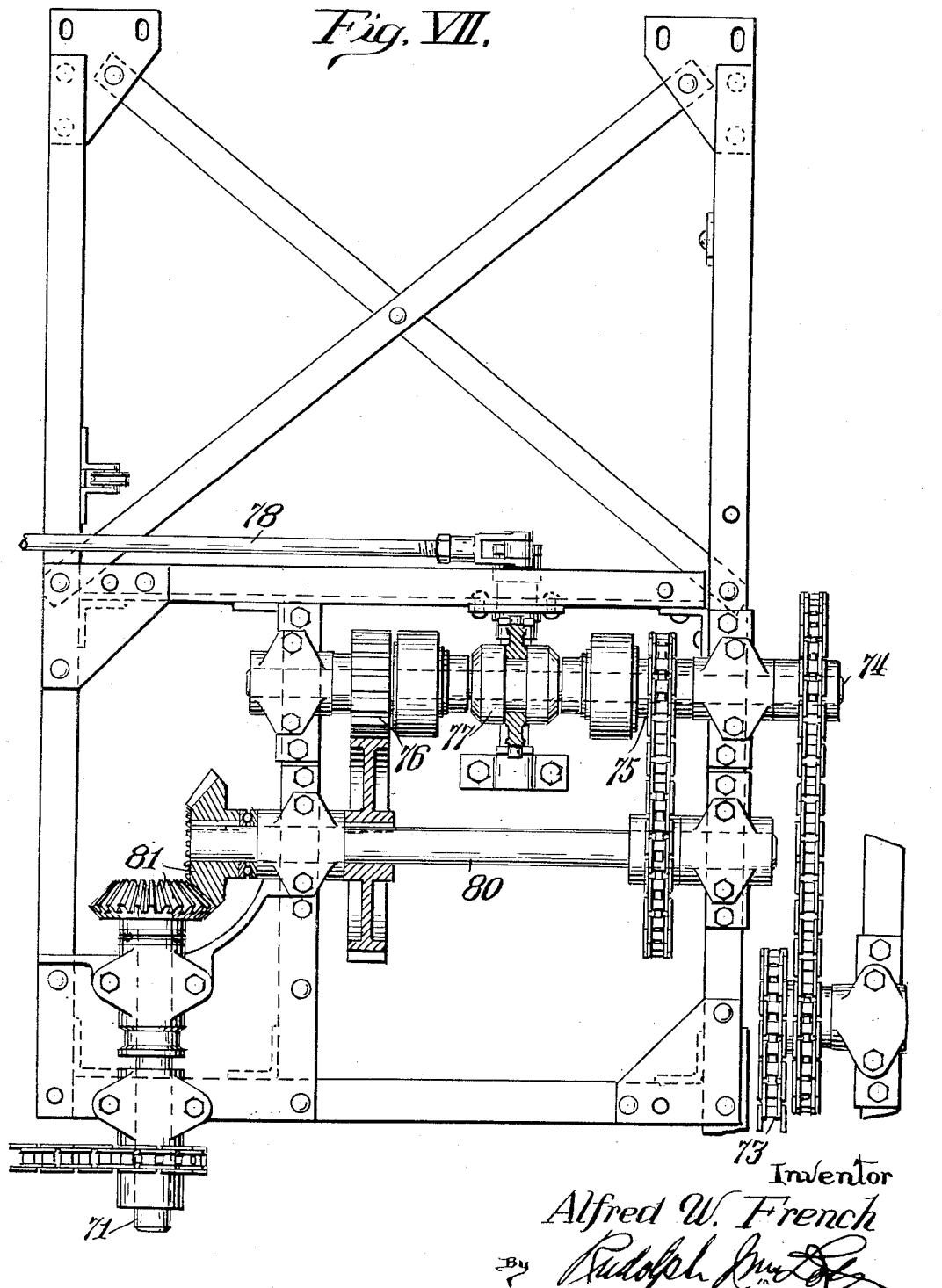

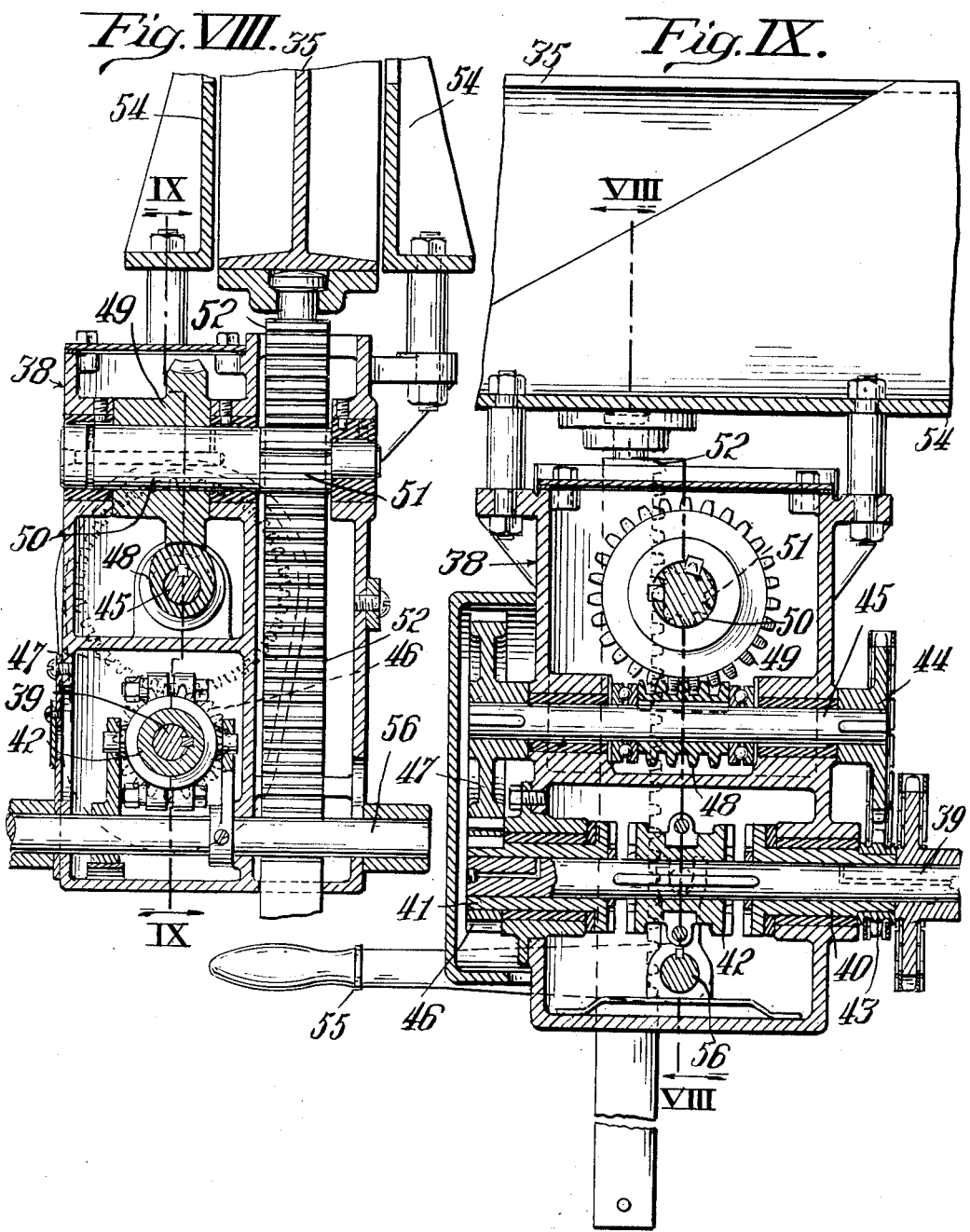

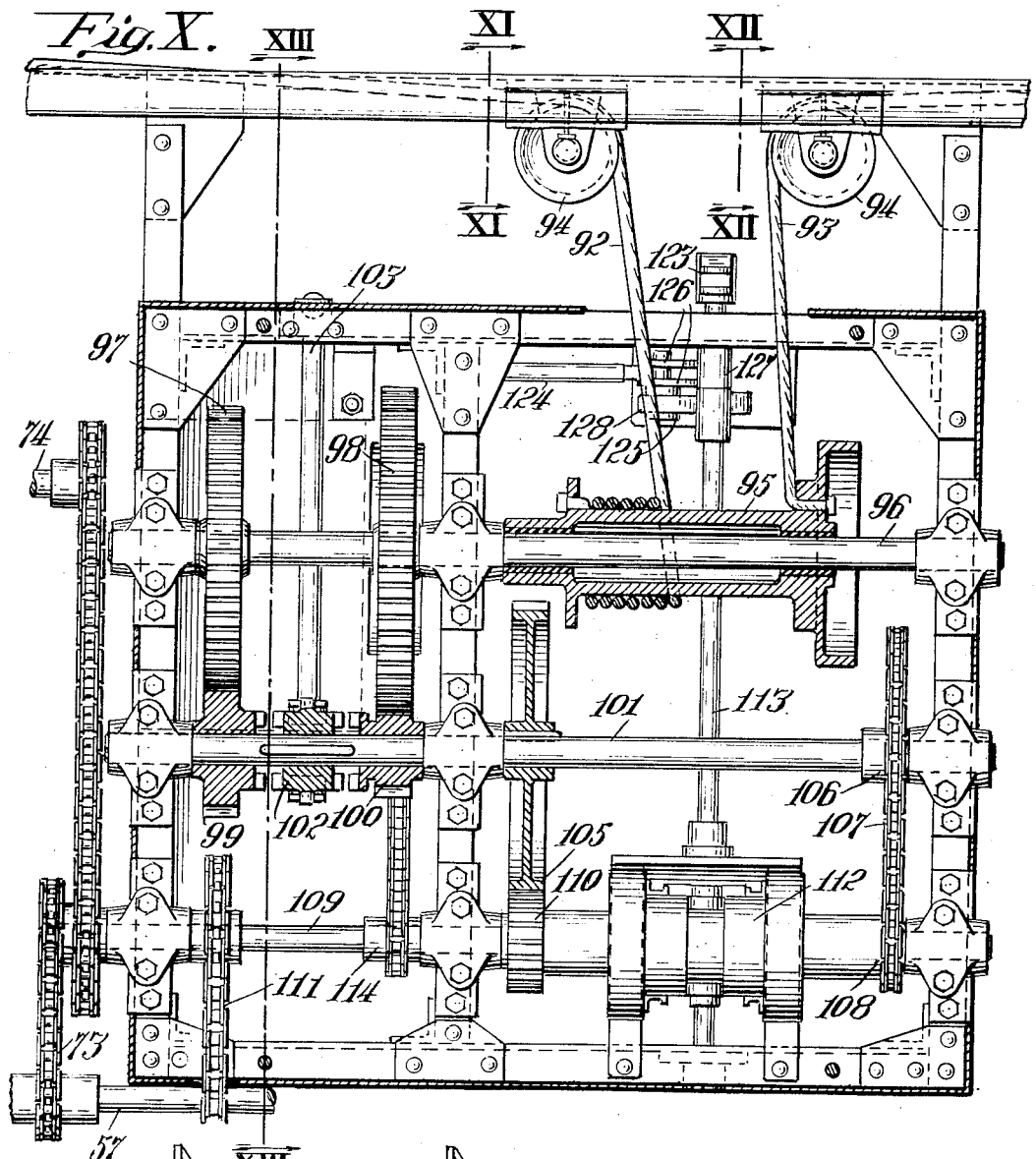
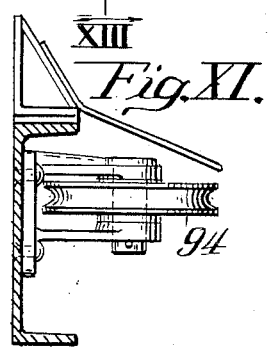
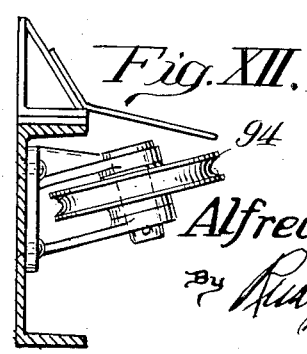

Aug. 8, 1939.  A. W. FRENCH  2,169,184
GRADING AND EXCAVATING MACHINE
Filed Aug. 20, 1936  10 Sheets-Sheet 9
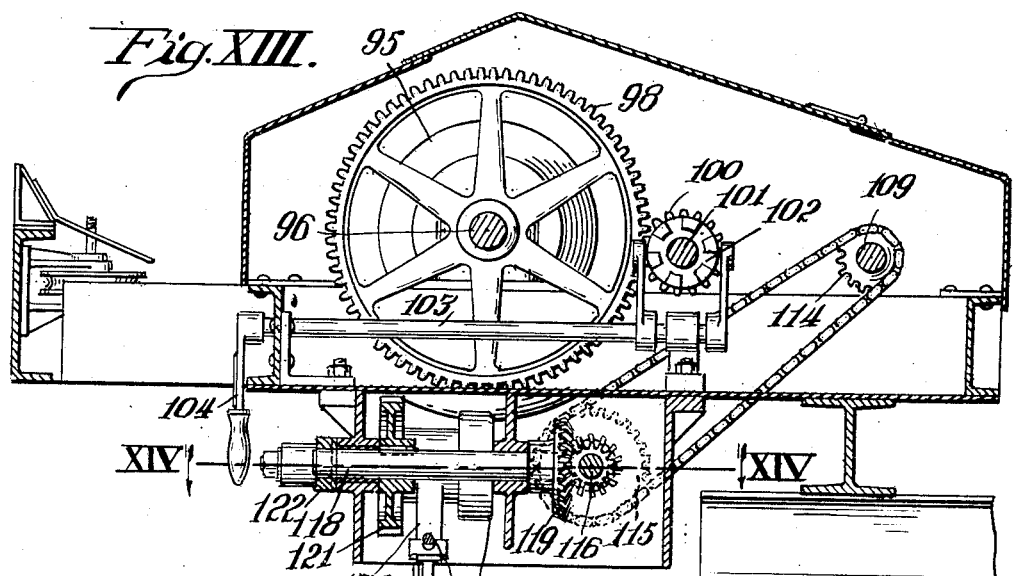
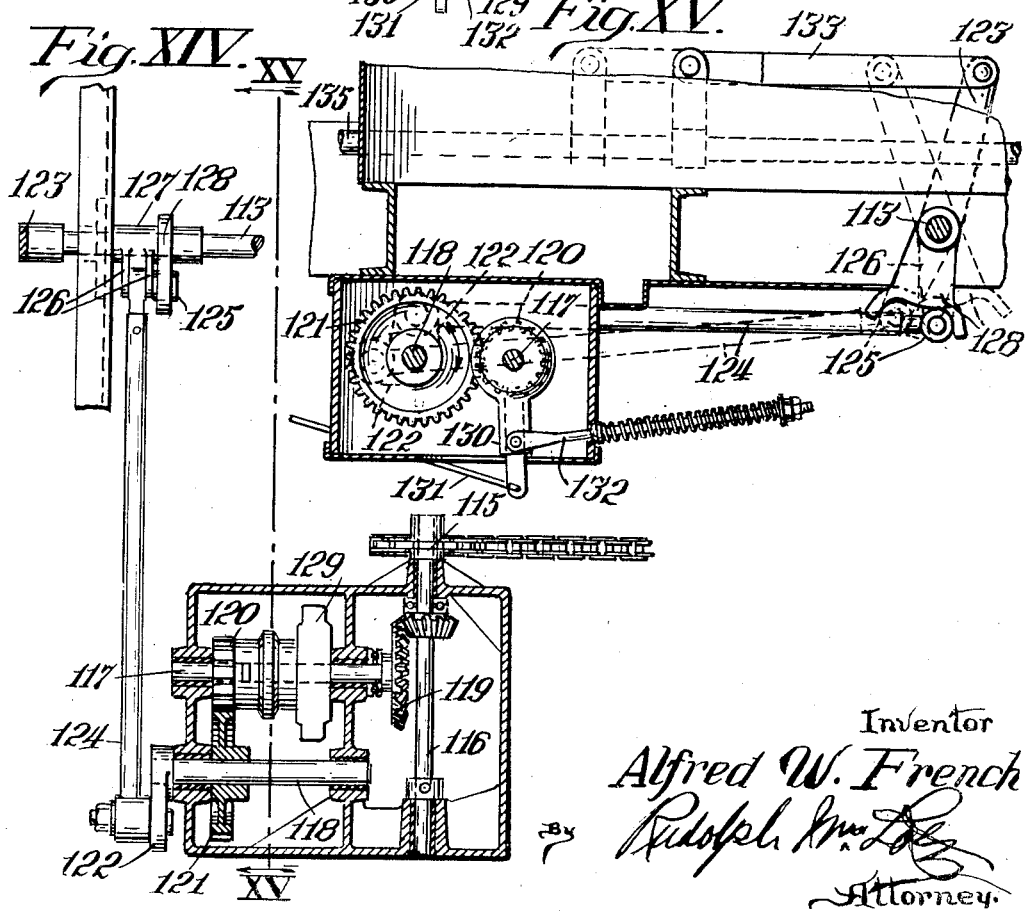
Inventor
Alfred W. French

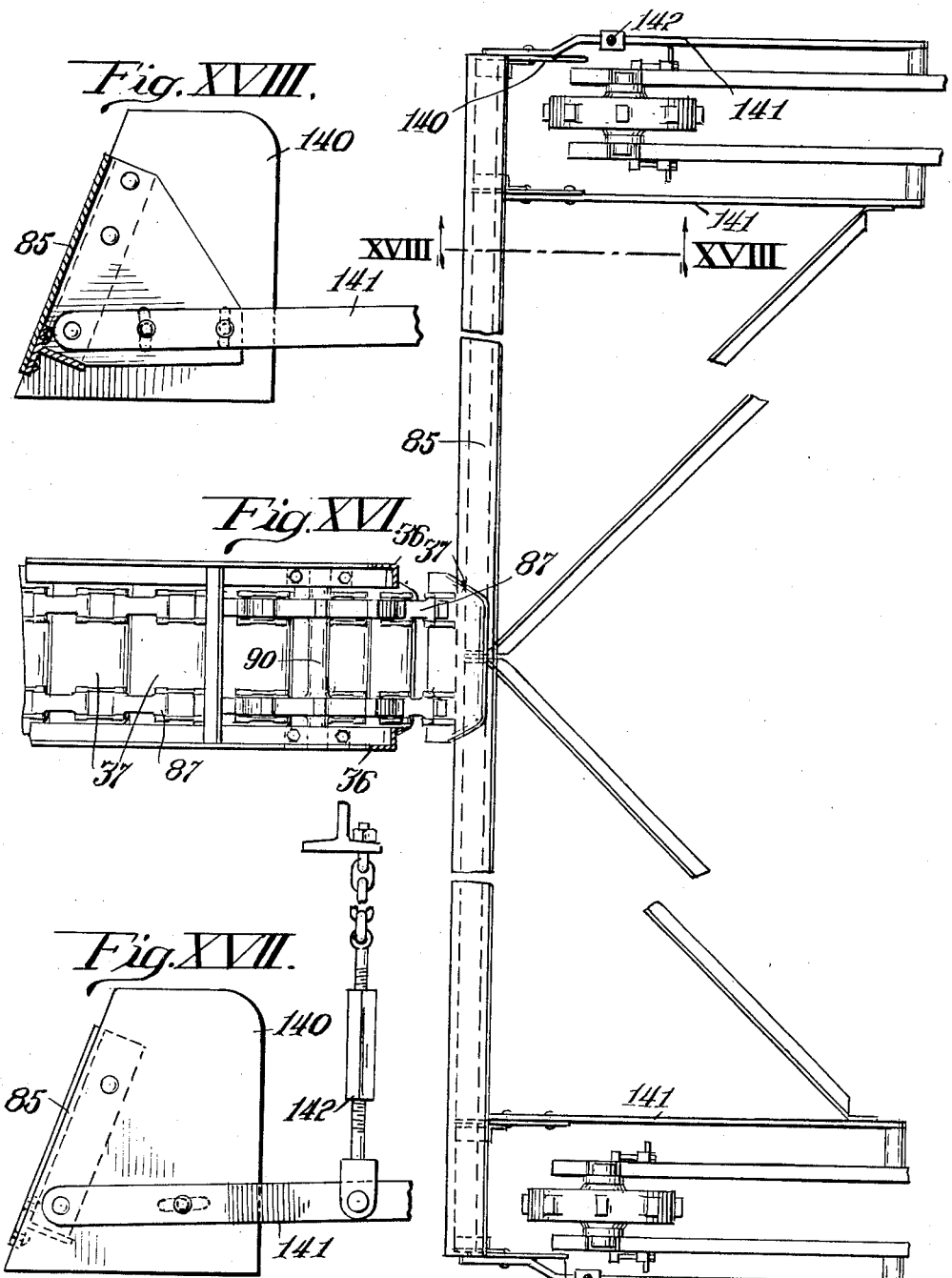

Patented Aug. 8, 1939

2,169,184

UNITED STATES PATENT OFFICE 2,169,184

GRADING AND EXCAVATING MACHINE

Alfred W. French, Chicago, Ill.

Application August 20, 1936, Serial No. 97,019

45 Claims. (Cl. 37—108)

The invention relates to improvements in machines for doing general grading of soil, for stripping top soil from mineral deposits such as gravel placers and open pit mines; for heavy excavation, and for providing pavement grades of all types with respect to profiles thereof and including the grades at the sides of the pavement grade upon which side forms or rails are disposed between which the plastic paving material is deposited.

The main object of the invention is to provide a machine adapted for all of the above mentioned and other purposes which is capable of continuous forward travel and wherein the earth removing mechanism travels alternately in opposite directions transversely of the direction of travel of the machine and over a path of greater width than the tractors which support the frame of the machine, thereby enabling the whole machine to dig itself into the earth to any desired depth within certain limits for excavating earth to said depth in a single operation over any desired distance.

A further object of the invention is to provide a machine of the type specified wherein the earth-removing mechanism is actuated independently of the traction elements and is readily and easily adjustable vertically and otherwise with respect to the frame of the machine, and, further, wherein said mechanism travels on interchangeable rails shaped to accord with the profile of a pavement grade to be provided thereby and may be easily adjusted during travel of the machine to cut the desired grade accurately.

A further object of the invention is to provide a machine of the type specified wherein the earth-removing mechanism may be caused to travel laterally over any desired fractional part of the full limit of its lateral travel or may be maintained at any point in its lateral travel as in road shoulder grading and shallow trenching operations and, further, wherein said mechanism may be caused to travel laterally while the frame of the machine remains idle.

A further object of the invention is to provide a machine of the type specified which will remove vast quantities of earth or loose material at relatively small expense for power as compared with steam shovels and dredges, and which can be constructed and maintained in good repair at a relatively small fraction of the cost of a steam shovel or dredge of the type used for heavy duty purposes.

Other objects and advantages of the invention are pointed out or will be understood from the following specification:

A suitable embodiment of the invention is illustrated in the accompanying drawings, wherein, Fig. 1 is a side elevation of a grading and excavating machine constructed in accordance with the invention.

Fig. 2 is a rear elevation of the same, partly in section.

Fig. 3 is a plan sectional view of the same on the line 3—3 of Figs. 1 and 2.

Fig. 4 is a fragmentary vertical transverse sectional view on an enlarged scale on the line 4—4 of Figs. 1 and 3.

Fig. 5 is a detail sectional view on the line 5—5 of Fig. 4.

Fig. 6 is a detail fragmentary plan section on an enlarged scale illustrating the mechanism for propelling the vehicle of the machine forward and reverse and for steering the same.

Fig. 7 is a detail fragmentary plan sectional view on an enlarged scale illustrating mechanism for driving the conveyor belt of Fig. 4.

Fig. 8 is a detail vertical sectional view on an enlarged scale on the line 8—8 of Fig. 9 showing the mechanism for raising and lowering the runway or elevator of the vehicle on which the carriage of the earth-removing mechanism travels.

Fig. 9 is a section on the line 9—9 of Fig. 8.

Fig. 10 is a detail plan section on an enlarged scale illustrating the mechanism which causes the carriage of the earth-removing mechanism to travel on the runway or elevator of the vehicle of the machine.

Figs. 11 and 12 are detail sections on the lines 11—11 and 12—12, respectively, of Fig. 10.

Fig. 13 is a detail vertical section on the line 13—13 of Fig. 10.

Fig. 14 is a detail plan section on the line 14—14 of Fig. 13.

Fig. 15 is a detail vertical section on the line 15—15 of Fig. 14.

Fig. 16 is a fragmentary plan view of the vehicle frame, a portion of the frame of the carriage of the earth-removing mechanism being shown in section.

Fig. 17 is a fragmentary side elevation showing a side portion of strike-off device of the vehicle.

Fig. 18 is a detail vertical section on the line 18—18 of Fig. 16, also showing the strike-off device.

The machine comprises mainly a suitable vehicle frame which is supported upon a pair of tractor elements operable independently of each other for steering purposes. The vehicle frame may be of any desired width and of such height as the purposes for which the machine is to be used may dictate, all within practical limits.

Mounted upon the vehicle frame is an elevator extending over substantially the entire width and length of the vehicle frame and which is supported at substantially its four corners on power actuated jacks, each of which is operable independently of the others so that the elevator may be raised and lowered and tilted sidewise and diagonally.

The elevator is equipped with parallel rails extending transversely of the vehicle frame and upon which the carriage of the earth digging and removing bucket elevator mechanism travels from side to side of the vehicle frame. This carriage carries the engine which acuates said mechanism. The latter digs and removes earth over a width of space greater than that separating the outermost parts of the traction elements and across the path of their travel and for such length horizontally as will permit the vehicle to travel forward a distance somewhat less than the length of cut effected by said bucket mechanism during completion of travel of the latter from one side limit to the other side limit of its travel. The carriage for said bucket mechanism and the said elevator are rendered sufficiently flexible to permit the tilting of the elevator as above described without causing the traction wheels of the said carriage to leave the said rails as one corner portion of the elevator is raised or lowered relatively to the remainder thereof, said up or down motion being slight and requiring only limited flexing of the said elevator and carriage.

The digging mechanism thus makes overlapping zig-zag cuts between the limits of its lateral travel to provide a continuous grade. The profile of the crowns of the rails on the elevator determines the profile of the grade cut by the bucket mechanism and this profile is easily changed by an interchange of said rails.

The operation of the machine is controlled by two men walking along opposite sides of the vehicle frame within easy reach of all control levers.

The earth taken up by the buckets is delivered upon a conveyor belt or belts which discharge it beyond one or both sides of the vehicle frame and the grade cut by the bucket mechanism.

The engine which actuates the traction elements to propel the vehicle is also geared to the jacks for raising and lowering the elevator and also actuates the carriage of the bucket mechanism for causing the latter to travel upon the said elevator.

The foregoing brief description will aid in the comprehension of the following detailed description of the machine which, in the instance illustrated, is adapted for very shallow excavation work, such as is requisite to accurate grading or removal of earth to a depth of about twelve inches or less, to provide a shallow trench. For deep excavation purposes, the vehicle frame must be narrower than the width of cut effected by the excavating mechanism and the control levers positioned for easy access from the rear or inner part of the vehicle frame. Such changes in construction and arrangement as are necessary to adapt the machine for various uses are mere matters of engineering and lie within the scope of the invention.

*The vehicle and its propelling and steering mechanism*

In Fig. 1, the vehicle frame is shown as constructed of conventional structural steel elements, such as channel bars, I-beams and angle-bars, 1, 2 and 3 extending laterally, longitudinally and angularly in inter-connected relation to each other to provide a relatively rigid structure which is equipped with trucks 4 carrying the bearings 5 for the shafts 6 and 7 of the traction members 8 of the chain tread type. The said frame is relatively low compared to the height of the whole machine.

Fig. 6 illustrates the gearing between the shaft 10 of the engine 9 mounted upon the vehicle frame (Fig. 3), and the traction members 8. Shaft 10 is geared to the shaft 11 by means of sprocket chain gearing. Shaft 11 carries the gear pinion 12 and the sprocket wheel 13 between the bearings 14. A spur gear wheel 15 is loosely mounted on one end of the shaft 11. Said wheel 15 is equipped with clutch teeth for engagement with the sliding clutch member 16 which is operated manually by means of the crank rod 17.

The gear pinion 12 meshes with a gear wheel 18 and the sprocket wheel 13 is geared to sprocket wheel 19, said wheels 18 and 19 being loosely mounted on a countershaft 20 which carries the sliding tooth clutch member 21 adapted to be thrown into engagement with the teeth integral with the respective wheels 18 and 19. The clutch member 21 is operated similarly to the clutch member 16 by means of the manually operable shaft 22.

The gear wheel 15 meshes with the gear wheel 23 rigid with shaft 20. The latter is rotated in one direction for forward travel of the vehicle at respectively different speeds by the gear wheels 12 and 15, respectively, as determined by the positions of the respective clutch members 16 and 21, and when both 18 and 15 are disengaged from the clutch members 21 and 16 and clutch member 21 is engaged with wheel 19, the travel of the vehicle will be reversed.

The gear wheel 23 meshes with gear wheel 24 rigid with shaft 25. The latter carries loosely two gear wheels 26 and 27 each rigid with one of the respective clutch members 28 and 29 which are of any suitable type and are manually operated by means of shafts 30 and 31, respectively.

The gear wheels 26 and 27 mesh, respectively, with the gear wheels 32 on the shafts 33, the latter being geared to the shafts 6 and rotated in unison or independently of each other to effect, respectively, either straight travel of the vehicle forward or back or to steer the same.

The several shafts 17, 22, 30 and 31 are equipped with cranks connected with rods which connect with operating levers at one side of the vehicle frame (see Fig. 3).

The mechanism of Fig. 6 is disposed in the casing 34 on the vehicle frame.

*The elevator operating mechanism*

The runway or elevator consisting of a pair of parallel I beams 35 connected at points spaced from their ends by cross-beams upon which the carriage 36 for the bucket mechanism 37 travels, is carried by four jacks 38 at substantially its four corners. Said jacks are mounted on the vehicle frame, the casings of said jacks being shown in Figs. 1, 2 and 4 and the operating mechanism common to all of them being shown in Figs. 8 and 9.

Each of said mechanisms (Figs. 8 and 9) includes a shaft 39 suitably geared to the shaft of engine 9. Shaft 39 carries two hollow shafts 40 and 41 loosely mounted thereon. Each of said hollow shafts is equipped with clutch teeth for engagement with the sliding clutch member 42. The shaft 40 carries the sprocket wheel 43 geared to the sprocket wheel 44 on the countershaft 45. Shaft 41 carries the gear pinion 46 meshing with the gear wheel 47 on the shaft 45. The latter carries the worm 48 which meshes with the worm wheel 49 on the transverse shaft 50.

Said shaft 50 is equipped with a spur gear pinion 51 which meshes with the teeth of the vertical rack-bar 52 which is mounted in suitable guides in the casing of the mechanism. Mounted upon the rack-bar 52 is one end of one of the two parallel I-beams 35 which carry the rails 53 upon which the carriage of the bucket mechanism travels (Fig. 4). Said I-beams 35 are mounted in the guides 54 of the vehicle frame. The clutch member 42 is actuated by means of the hand lever 55 on the shaft 56. The shaft 56 for the rear jack at each side of the machine extends to and is journalled in a bearing carried by the opposed end of the shaft 56 of the front jack so that the operating levers for both jacks are disposed so closely adjacent each other as to enable both levers to be operated in unison by the operator.

Earth discharge conveyor

In Figs. 1, 2, 4 and 5, there is shown a conveyor belt 59 trained over wide pulleys 60 at opposite sides of the machine. The bearings for the shafts of said pulleys are mounted in the ends of the truss-frame 61 which is carried by upright vehicle frame members 62. The truss frame 61 carries bearings for the trunnions of idle rolls 63 (Fig. 5) which carry the loaded portion of the belt 59 to prevent spill of earth delivered upon the same.

At each side of the machine there is pivotally mounted a member upon which the belt 59 discharges. One of these members comprises a frame 64 carrying pulleys 65 over which the belt 66 is trained.

The other of said members is a chute 67 which is employed only when the earth is to be discharged closely adjacent one side of grade or shallow trench cut by the machine or is to be discharged into vehicles traveling adjacent one side of the machine.

The belt 66 is employed in instances where the earth is to be discharged at a distance from or to a point elevated above and spaced from the discharge end of the belt 59. The members 64 and 67 are interchangeable with each other, one of the pulleys 65 being geared to one of the pulleys 60 of the belt 59 by means of sprocket chain gearing indicated at 68 in Fig. 4.

A sprocket chain 69 (Figs. 1, 2 and 4) trained over idle sprocket wheels 70 connects one of the pulleys 60 with a shaft 71 projecting from a casing 72 which contains the mechanism shown in Fig. 7.

As shown in Fig. 7, the sprocket chain 73 is driven by the shaft 57; the latter is geared to the shaft 74 which carries the sprocket wheel 75 and gear pinion 76, both being loose on said shaft and equipped with clutch elements for engagement with the sliding clutch member 77 operable by means of the rod 78 which connects with hand lever 79.

The sprocket wheel 75 is geared to the shaft 80 to rotate the latter in one direction and the pinion 76 is geared thereto to rotate the same in the opposite direction, said shaft 80 being geared to the shaft 71 by means of mitre gears 81, the belt 59 being thus driven in the direction determined by the position of the clutch member 57.

The bucket mechanism

The carriage for the bucket digging and elevating mechanism comprises the frame members 36 (Fig. 1); the rear end portion of said carriage is equipped with pairs of wheels which ride upon the rails 53 of the elevator beams 35. The upper portion of the carriage bridges the conveyor belt 59 and carries an open bottom chute 82 into which the earth is discharged.

A plate 83, pivoted at its upper end to the side walls of the chute 82 may be set to occupy the position shown in Fig. 1 to cause the earth discharged into said chute to be delivered into the trough 84 from which it falls upon the ground back of the zone of operation of the buckets and in front of the scraper or strike-off member 85 which extends the entire width of the vehicle frame and is adjustable vertically (Figs. 16, 17 and 18).

Said plate 83 may be swung back from the position shown in Fig. 1 to cause a part or all of the earth to be discharged upon the belt 59, the latter being disposed directly in the path of the earth discharged from the buckets.

The purpose of discharging earth back upon the ground as above described, which occurs during grading operations, is to fill in hollows that occur more or less frequently due to faulty rough grading done in advance of fine grading operations as a general rule, or which are due to natural surface conditions.

Mounted upon the rearmost portion of the carriage is the engine 86 which performs no other function than that of driving the bucket chain 87 which carries the buckets 37.

The front portion of the carriage includes a triangular frame at the apex of which there are mounted the bearings for the shaft 88 driven by sprocket chain gearing to the shaft of the engine 86, as shown in Fig. 1. The shaft 88 is equipped with the sprocket wheels over which the bucket chain 87 is trained, said chain being trained also over pairs of sprocket wheels on the idle shafts 89 and 90 at the base of said triangular frame, the axes of said shafts 89 and 90 being disposed in a plane parallel with the plane of the treads of the traction members, 8.

At the rear ends of the horizontal frame members 36 on respectively opposite sides of the carriage, there are idle rolls 91, which bear against the front frame member of the vehicle to take up the back or thrust pressure exerted upon the lower end portion of the carriage by the resistance to the travel of the buckets 37 through their digging or cutting zone of travel.

The buckets 37 are caused to travel at a relatively high speed and through a relatively long earth-cutting zone.

The mechanism for effecting travel of the carriage of the bucket mechanism

In Fig. 3 there is shown a cable 92 trained over sheaves 93 mounted upon the outer ends of the upper front cross-frame member of the vehicle frame. This cable is also trained over the sheaves 94 mounted upon a lower cross-frame member of the vehicle frame (Fig. 10) and is secured at its opposite ends to the drum 95 (Figs. 10 and 13). The upper portion of the cable 92 spanning the space between the sheaves 93 is secured to the carriage of the bucket mechanism. One of the sheaves 94 rotates on a vertical axis and the other thereof on an axis inclined from vertical (Figs. 11 and 12).

The shaft 96 rigid with drum 95 is also rigid with the spur gear wheels 97 and 98 which mesh respectively with the spur-gear pinions 99 and 100 loosely mounted on the shaft 101 which carries the sliding clutch member 102 engageable alternately with said pinions 99 and 100 for driving said drum 95 at different speeds. The clutch member 102 is operated by means of the manually operable shaft 103 equipped with the hand lever 104 (Fig. 13).

Shaft 101 is rigid with the spur gear wheel 105 and the sprocket wheel 106. The latter is connected by sprocket chain 107 with the sprocket wheel 108 loosely on the shaft 109 which carries also the loose spur gear wheel 110 meshing with the gear wheel 105. The shaft 109 is geared to the engine shaft 10 by means of the sprocket chain 111. The wheels 108 and 110 are equipped with long hubs equipped with clutch members for engagement with the sliding clutch member 112 operable by means of the shaft 113.

The shaft 96 is driven at low speed by the pinion 100 and at higher speed by the pinion 99.

The shaft 101 is driven in one direction by means of the gears 105 and 110 and in the reverse direction by the sprocket gearing 106, 107 and 108.

The shaft 113 for shifting the clutch member 112 is operated automatically by the mechanism illustrated in Figs. 13, 14 and 15.

On the shaft 109 there is mounted a small sprocket wheel 114 geared to the sprocket wheel 115 shown in dotted lines in Fig. 13 and which is mounted on a shaft 116. The latter is geared to a shaft 117 (Fig. 15) parallel with shaft 118, by means of bevel gearing 119 (Figs. 13 and 14). Shaft 117 is geared to shaft 118 by means of spur gear wheels 120 and 121. The shaft 118 is equipped with a crank 122 which is connected with one end of a lever 123 by means of the connecting rod 124.

A roller 125 on the pin or shaft, which joins the rod 124 with the arms 126 of the sleeve or collar 127 operates to throw the rocker arm 128 from the position shown in full lines in Fig. 15 to its dotted line position and vice versa.

The gear element 129 is loose on the shaft 117 and is one-half of the pitch diameter of the gear wheel 121. A punch press clutch 129 of conventional type connects the shaft 117 with the gear pinion 120 to cause the latter to make a complete revolution at predetermined intervals. This causes the rod 124 to move alternately in opposite directions to throw the rocker arm 128 over to the aforesaid respective limits of its movement, there being a period of lost motion determined by the space separating the projections of the rocker 128 which the roller 125 engages. The said roller 125 always returns to a position midway of its limits of movement.

The clutch 129 is equipped with an arm 130 (Figs. 13 and 15) which is connected with the cable 131 and with a rod 132. On the latter there is a compression spring which holds the rod 132 and the arm 130 in a predetermined position wherein the clutch 129 is idle. As the respective vertical portions of the cable 131 are moved, (Fig. 15) the punch press clutch acts to impart a single revolution to the gear pinion 120 and is then restored automatically to idle position by means of the rod 132 and the spring thereon.

The lever 123 which is rigid with the rocker arm 128 is connected by means of a link 133 with an arm 134 rigid with a sliding shaft or rod 135, which is also shown in Fig. 3. Said shaft 135 is equipped at its ends with handles 136 by means of which it may be moved manually to throw the rocker arm 128 from either of its two respective positions of Fig. 15 to a position wherein the clutch 112 is in neutral, thus interrupting travel of the bucket elevator carriage.

The cable 131 is anchored at its lower left hand end and is trained over sheaves 138 mounted upon the truss frame 61 and is also trained at its lower left-hand end portion (Fig. 2) over a sheave (not shown), its adjacent extremity being secured to said arm 130 of the punch press clutch.

Mounted upon the carriage of the bucket element as shown in Fig. 2 are longitudinally adjustable rods 139, the outer ends of which strike the respective vertical portions of the cable 131 as said carriage approaches the respective limits of its travel on the rails 53 and thus causes said cable to pull the punch press clutch arm 130 to the left (Fig. 15) into punch press clutch operating position for imparting a full revolution to the pinion 120 and half revolution to the gear wheel 121.

The vertical portions of the cable 131 are disposed within easy reach of the operators and may be manually operated at any point in the travel of the bucket elevator carriage to reverse the travel thereof as to avoid large rocks or for other reasons.

By adjusting the rods 139 to project farther outwardly from the sides of the carriage of the bucket elevator, the travel of said carriage will be shortened, the positions of the said respective rods 139 relatively to said carriage being variable to limit travel of said carriage to any desired portion of its normal path, as, for example, from the middle of the rails 53 to a predetermined point spaced from the middle.

In the instant machine, the limitations of travel of the elevator bucket are important in the grading of road shoulders following completion of pavement operations. To grade the road shoulder at one side of the pavement, one of the traction members of the machine will travel upon the pavement and the other upon said shoulder while the elevator buckets are caused to travel laterally from a side edge of the pavement to the determined outer edge of the shoulder.

Obviously, the rails 53 shown in Fig. 2 will be replaced by rails shaped and positioned to cause the buckets to cut desired grades in accordance with the predetermined profiles thereof.

Following shoulder grading, or otherwise, the machine may be used to cut a shallow trench in the shoulder parallel, for example, with the side edge of the pavement and adjacent to or spaced therefrom. Said trench will be of minimum width equal to that of the buckets or of as much greater width as may be desired and which will be controlled by the positions of the rods 139 in the latter instance and by the neutral position of the clutch member 112 if the trench is to be of no greater width than the buckets.

The depth of a narrow trench will be determined by the vertical adjustment of the elevator beams 35 which, in the instant case, permit the buckets to cut to a maximum depth approximately one foot below the plane of the treads of the traction elements. Greater depth of trench cut may be effected by employing, for example, buckets of greater depth between front and rear walls and by interposing spacing members between their rear walls and the chains upon which said buckets are mounted.

*Means for filling hollows*

In grading operations, the customary primary step is to plow up the ground to a depth approximating the level of the ultimate grade desired, removing all but an average level of earth from two to six inches above the ultimate grade level, and using surplus earth to fill deep hollows. These primary operations are effected usually by mean of plows and so-called "wagon-graders." Deep fills are compacted by means of heavy rollers. Then the so-called "chalk lines" disposed upon stakes are disposed along and bordering, but slightly spaced from and parallel with side edges of the predetermined fine grade and at an elevation above and to define a horizontal plane parallel with the bottom horizontal plane of the fine grade which, generally, is crowned between its side edge portions.

The rough-grading is usually very inaccurate and leaves too much earth along some stretches and hollows along other stretches.

Accordingly, in the operation of the present machine, means are provided for overcoming the inaccuracies of the rough grading operations and also to overcome variations in hardness of the earth upon which the traction elements travel.

The carrying capacity of the buckets is such that at the maximum rate of travel of the vehicle, said buckets can remove no more than a predetermined depth of earth crust which may be assumed, in this instance, to be four inches. Hence, if a depth of six or eight inches or more of earth crust is encountered, the travel of the vehicle is slowed and, where necessary, is stopped, while the buckets remove first a top layer of crust and then one or more lower levels successively by first raising the elevator beams 35 and, when the bucket elevator carriage has attained one limit of its travel, stopping it there while the beams 35 are lowered and then causing said carriage to travel to the other limit of its movement. Such operations are controlled by the shaft 135 and the jacks which carry said beams.

As previously pointed out, the chute 82, plate 83 and trough 84, enable the operator to cause earth delivered into said chute by the buckets to be returned in whole or in part upon the grade behind the path of travel of the buckets. This loose earth, which is in a fairly finely divided state, because of the obvious thin slice cuts made by the successive buckets, must be carried forward as the vehicle approaches a hollow, in order to fill the latter. To accomplish this, there is provided a strike-off plate 85 (Figs. 1, 16, 17 and 18) which extends over the maximum lateral cutting zone of the buckets. This plate is equipped with side flanges 140 to which the outer end portions of the supporting arms 141 are secured. The rear ends of said arms 141 are pivotally secured to vehicle frame members. Links 142 which are adjustable in length, are pivotally secured at their lower ends to the arms 141 between the ends of the latter, and at their upper ends are secured to the front elevator beam 35. Accordingly, said plate 85 will be raised and lowered, substantially equally with the bucket mechanism. The adjusting means associated with the links 142 (Fig. 17) enable the plate 85 to be adjusted so that its lower edge is at all times disposed at the desired elevation above the horizontal plane of the bottom of the fine-grade produced by the buckets.

Earth dropped from the trough 84 is levelled off to the depth determined by the position of said plate 85 and the surplus earth is carried forward until the hollow to be filled in is reached. Then said surplus earth will, generally, fill such slight hollows as are usually encountered, deeper hollows being filled in by other means.

The I-beams 35 of the elevator are equipped at both ends with vertically adjustable guide devices 143, notches in the outer ends of which are maintained accurately in horizontal alignment with the chalk lines 144 at the sides of the grade hereinbefore mentioned; said guide devices are maintained in such alignment by operating the elevator jacks by means of the levers 55. The said guide devices are disposed at the same elevation above the cutting zone of the buckets 37 as the chalk lines are disposed above the predetermined side portions of the grade to be cut.

At one side of the elevator there is also mounted a guide device 137 which is maintained disposed in vertical alignment with one of the chalk lines 144 by operating the steering mechanism of the machine, said device 137 constituting the steering guide for the operator at one side of the machine.

The operators at the sides of the machine, which usually travels at a speed approximating five feet per minute, must operate the jack-levers 55 almost constantly to maintain the guide devices 143 horizontally aligned with the lines 143.

*Miscellaneous details*

The engine 9 is controlled by means of the manually operable crank 145 (Fig. 2) connected with the hand lever 147 by means of the rods 146.

The respective clutch operating shafts 17, 22, 30 and 31 (Fig. 6) by means of which the steering, change of speed and forward and reverse travel of the vehicle are effected, are connected with the hand levers 148, 149, 150 and 151 at one side of the vehicle frame (Fig. 1 and Fig. 3) so that the steering of the vehicle and reverse travel thereof lies wholly within the control of one of the operators.

Obviously, when the machine is employed to dig a trench as above indicated, the front of the elevator may be lowered to its limit and the rear thereof raised to its limit. This will cause the forward lower corner of the bucket carriage to be lowered appreciably and will cause the buckets to excavate to greater depth.

Two bucket mechanisms and carriages therefor may be employed and coupled for travel in unison, each thereof in that case, traveling from the middle of the elevator to an end thereof.

Slip clutches or similar devices are included in the gearing between the engine 86 and the bucket elevator and in the gearing between the engine 9 and traction members 8, and the mechanism propelling the bucket elevator mechanism along the elevator beams 35 to prevent breakages due to encountering obstacles such as large rocks partly embedded in the soil within the zone of operation of the machine. Such clutches and equivalent means for accomplishing the purpose thereof are well known in the art and, therefore, particular description of same is omitted.

I claim as my invention:

1. A machine of the type specified comprising a vehicle, a runway mounted thereon and extending laterally thereof, manually controlled power actuated mechanism for raising, lowering and tilting said runway, a traveling earth-removing and elevating mechanism mounted upon said runway, an engine carried by said last-named mechanism for actuating the same, an engine on the vehicle frame and geared to said last-named mechanism for effecting automatic travel of the latter on said runway in alternately different directions and for propelling the vehicle, and means operatively associated with said gearing between said last-named engine and said earth removing mechanism for automatically reversing travel of the latter on said runway between predetermined limits of said travel.

2. A machine of the type specified comprising a vehicle, a runway mounted thereon and extending laterally thereof, manually controlled means for raising and lowering and tilting said runway, a traveling earth removing and elevating mechanism mounted upon said runway, an engine carried by said mechanism and actuating the same, and an engine on the vehicle for effecting travel of said mechanism on said runway in alternately different directions and for propelling the vehicle, and gear sets connecting said last-named engine with said raising and lowering means and with said means for effecting travel of said mechanism, respectively.

3. A machine of the kind specified comprising a vehicle frame, traveling supports therefor, a runway mounted on said frame and extending transversely thereof and over said traveling supports, an earth excavating and elevating mechanism mounted for travel on said runway, an engine carried by said mechanism for actuating the same, an earth conveying means upon which removed earth is discharged from said mechanism, a mechanism for causing said excavating mechanism to travel in alternately opposite directions over the entire length of said runway and in advance of said traveling supports, an engine on the vehicle frame, gear sets connecting the last-named engine with said traveling supports and both said mechanisms and said conveying means, an earth receiving chute into which said excavating mechanism discharges, and means within the latter for causing said earth to be discharged upon said conveying means or upon the grade cut by said excavating mechanism.

4. A grading machine comprising a vehicle, a runway extending transversely thereof, interchangeable guide rails mounted on said runway, a carriage equipped with an earth excavating and elevating mechanism mounted for travel on said rails in alternately opposite directions, said rails adapted to cause said excavating mechanism to cut a grade of predetermined profile, an engine on said carriage for actuating said mechanism, manually controlled means for raising, lowering and tilting said runway, an engine on the vehicle for propelling the latter and actuating said means, and gearing between said last-named engine and said carriage for propelling the latter.

5. A machine of the kind specified comprising a vehicle frame, traveling supports therefor, a member mounted on said frame and extending transversely thereof and over said traveling supports, manually controlled mechanism for effecting vertical movements of said member to raise, lower or tilt the same, excavating machine mounted for travel on said member, an engine for actuating said excavating machine, a mechanism for causing said excavating mechanism to travel in alternately opposite directions over the entire length of said member and in advance of said traveling supports, an engine on the vehicle frame, and manually controlled gear sets connecting the last-named engine with said several respective mechanisms.

6. A machine of the type specified comprising a vehicle equipped with tractive supports adjacent opposite sides thereof, a vertically adjustable runway mounted upon and extending over the entire width of the vehicle, a carriage mounted for travel over the entire length of said runway, an earth excavating mechanism and an engine for actuating the same mounted on said carriage and arranged for progressive removal of earth in advance of the vehicle and over a width sufficient to cut paths of travel for said tractive supports, a mechanism for effecting travel of said carriage alternately in opposite directions, mechanism for effecting vertical adjustments of said runway, an engine on the vehicle, and manually controlled gear sets connecting said engine with said tractive means, said adjusting means, and said last-named mechanism, respectively.

7. A machine of the type specified comprising a vehicle equipped with tractive supports adjacent opposite sides thereof, a vertically adjustable runway mounted upon and extending over the entire width of the vehicle, a carriage mounted for travel over the entire length of said runway, an earth excavating mechanism and an engine for actuating the same mounted on said carriage and arranged for progressive removal of earth in advance of the vehicle and over a width and length of path sufficient to provide a continuous grade extending laterally beyond the paths of travel of the tractive means during continuous travel of the vehicle, a mechanism for effecting travel of said carriage alternately in opposite directions, mechanism for effecting vertical adjustments of said runway for controlling the lateral profile of the grade cut by the excavating mechanism, an engine on the vehicle, and manually controlled gear sets connecting said engine and said tractive means, said adjusting means and said mechanism for effecting travel of said carriage, respectively.

8. A machine of the type specified comprising a vehicle equipped with tractive supports adjacent opposite sides thereof, a vertically adjustable runway mounted upon and extending over the entire width of the vehicle, a carriage mounted for travel over the entire length of said runway, a bucket elevator mounted on said carriage and having a substantially triangular path of travel for progressive excavation and removal of earth to substantially the level of the treads of the tractive means in a transverse path of appreciable length in advance of the vehicle and laterally beyond the paths of travel of said tractive means, an engine on said carriage for actuating said bucket elevator, a mechanism for effecting travel of said carriage alternately in opposite directions, mechanism for effecting vertical adjustments of said runway, an engine on the vehicle, and manually controlled gear sets connecting said engine with said tractive means, said adjusting means and said last-named mechanism, respectively.

9. A machine of the type specified comprising a vehicle adapted for continuous travel at relatively low speed, a runway mounted upon and extending transversely of the general direction of travel of the vehicle and substantially over its entire width, manually controlled means for raising, lowering and tilting said runway, a carriage mounted for travel from end to end of said runway and having its lower end portion projecting forwardly of the traction elements of the vehicle, a bucket excavator and earth elevating mechanism mounted on said carriage and having a path of travel horizontally of appreciable length for cutting away and removing an earth layer extending laterally beyond the paths of travel of said traction elements, an engine on the carriage for actuating said bucket mechanism, a mechanism on the vehicle for causing said carriage to travel alternately in opposite directions from end to end of said runway at a speed proportioned to the maximum speed of travel of the vehicle and the length of cut effected by the bucket mechanism to cause the latter to cut a continuous grade progressively in advance of the vehicle, and an engine on the vehicle geared to said traction elements and to said last-named mechanism for actuating the same in unison.

10. A machine of the type specified comprising a vehicle adapted for continuous travel at relatively low speed, a runway mounted upon and extending transversely of the general direction of travel of the vehicle and substantially over its entire width, a carriage mounted for travel from end to end of said runway and having its lower end portion projecting forwardly of the traction elements of the vehicle, a bucket mechanism mounted upon said carriage and having a path of travel horizontally of appreciable length for cutting away and removing an earth layer extending laterally beyond the paths of travel of said traction elements, an engine on the carriage for actuating said bucket mechanism, manually controlled mechanism for effecting vertical movements of said runway to control the level of cut effected by said bucket mechanism, a mechanism on the vehicle for causing said carriage to travel alternately in opposte directions from end to end of said runway at a speed proportioned to the maximum speed of travel of the vehicle and the length of cut effected by the bucket mechanism to cause the latter to cut a continuous grade progressively in advance of the vehicle, and an engine on the vehicle geared to said traction elements and to both said last-named mechanisms for actuating the same.

11. A machine of the type specified comprising a vehicle adapted for continuous travel at relatively low speed, a runway mounted upon and extending transversely of the general direction of travel of the vehicle and substantially over its entire width, rails mounted on said runway, a carriage mounted for travel on said rails from end to end of said runway and having its lower end portion projecting forwardly of the traction elements of the vehicle, a bucket mechanism mounted on said carriage and having a path of travel horizontally of appreciable length for cutting away and removing an earth layer extending laterally beyond the paths of travel of said traction elements, an engine on the carriage for actuating said bucket mechanism, manually controlled mechanism for effecting vertical movements of said runway to control the level of cut effected by said bucket mechanism, said rails shaped to control the profile of the cut effected by the bucket mechanism, a mechanism on the vehicle for causing said carriage to travel alternately in opposite directions from end to end of said runway at a speed proportioned to the maximum speed of travel of the vehicle and the length of cut effected by the bucket mechanism to cause the latter to cut a continuous grade progressively in advance of the vehicle, and an engine on the vehicle geared to said traction elements and to both said last-named mechanisms for actuating the same.

12. A machine of the type set forth comprising a vehicle, a guide and supporting member extending transversely of the vehicle frame from side to side thereof with its end portions disposed over the traction members of the vehicle, manually controlled means for effecting variations in position of said member vertically of said frame to raise, lower and tilt the same, a carriage mounted for travel from end to end of said member and having its lower end portion projecting in advance of the vehicle, an elevator bucket mechanism for cutting away and removing earth mounted on said carriage and having a relatively long path of travel in the direction of travel of the vehicle in advance of the latter, an engine on said carriage for actuating said bucket mechanism, a mechanism on the vehicle connected with said carriage for causing the latter to travel continuously in alternately opposite directions over said first-named member, the latter determining the profile of the cut made by said bucket mechanism during its lateral travel, and an engine on the vehicle geared to said traction members thereof and to said last-named mechanism for actuating the same in unison and at respective speeds proportioned to each other and the length of cut effected by the bucket elevator to cause the latter to cut a continuous grade progressively in advance of the vehicle upon the side portions of which said traction members are caused to travel as the vehicle advances, and gearing between the last-named engine and said first-named member.

13. A machine of the type specified comprising a vehicle, an earth excavating and elevating mechanism, a transverse runway for said mechanism mounted upon and extending over the entire width of the vehicle frame, a guide rail on said runway on which said mechanism travels for causing the latter to cut a grade of predetermined profile, manually controlled means for raising, lowering and tilting said runway, independently operating engines, one thereof actuating only the said excavating mechanism and the other thereof propelling the vehicle, mechanism for causing automatic travel of the excavating mechanism alternately in opposite directions along said rail, and manually controlled gearing between said last-named engine, said last-named automatic mechanism, and between said last-named engine and said means.

14. A machine of the type specified comprising a vehicle, a transverse runway mounted upon and extending over the entire width of the vehicle frame, a carriage mounted for travel over said runway, an engine thereon, an excavating mechanism carried thereby and actuated by said engine, an engine propelling the vehicle independently of the excavator carriage, interchangeable guide rails mounted selectively on said runway for causing said excavating mechanism to cut a grade of predetermined profile, manually controlled mechanism for effecting vertical adjustments and tilting of said runway selectively to cause said earth excavating mechanism to operate selectively at various elevations through a zone from below to above the level of the treads of the traction elements of the vehicle and mechanism geared to the last-named engine for automatically effecting travel of the said carriage along said runway alternately in opposite directions while said vehicle is in motion or at rest, and manually controlled gearing between said manually controlled mechanism and said last-named engine.

15. A machine of the type specified comprising a vehicle, an earth excavating and elevating mechanism, a transverse runway for said mechanism mounted upon and extending over the entire width of the vehicle frame and equipped with a guide rail on which said mechanism travels for causing the latter to cut a grade of predetermined profile, power means for actuating said mechanism and propelling the vehicle each independently of the other, manually controlled means for varying the speed of travel of the vehicle, power-actuated mechanism for automatically effecting travel of the said first-named mechanism along said rail alternately in opposite directions while said vehicle is in motion or at rest, means for effecting actuation of said first-named mechanism independently of its travel along said runway, manually controlled means associated with said last-named mechanism for controlling the length of travel of the excavating mechanisms along said runway, and manually controlled power actuated mechanism for raising, lowering and tilting said runway.

16. A machine of the kind specified including a vehicle, a frame adapted to travel transversely of the direction of travel of the vehicle, a power-actuated traveling earth cutting and elevating mechanism mounted in said frame, a member mounted on said vehicle extending from side to side thereof on which said frame travels, jacks upon which said member is supported, said jacks being disposed at the four corners of said member and being operable independently of each other and in pairs and in unison to raise, lower and tilt said member, mechanism on the vehicle for actuating the respective jacks, selectively interchangeable guide rails mounted on said member and on which said frame travels and whereby said excavating mechanism is caused to cut a grade of predetermined contour, and mechanism on the vehicle for effecting travel of the said frame on said rails.

17. A machine of the kind specified including a vehicle, an engine thereon for propelling the same, an elevator mounted on said vehicle and spanning the same from side to side thereof, mechanism for raising and lowering said elevator and tilting the same, a frame mounted for travel on said elevator, earth cutting and elevating mechanism mounted upon said frame, an engine on said frame for actuating said last-named mechanism, a conveyor on the vehicle upon which the last-named mechanism discharges, gearing between said conveyor and the first-named engine, and mechanism connecting the first-named engine with the said frame for effecting forced travel of the latter.

18. A grading machine including a vehicle, a guide runway spanning the same and presenting a contour substantially coinciding with the predetermined profile of a grade to be cut, mechanism for manipulating said runway to raise and lower the end portions thereof simultaneously or independently of each other, an excavating mechanism supported upon the said runway for travel thereon from side to side of the said vehicle and for guidance thereby, an engine for actuating said excavating mechanism, means for effecting travel of the latter on said member, and a second engine for propelling said vehicle and actuating said means.

19. A grading machine including a power propelled vehicle adapted to travel on ground along a strip to be graded, an elevator on said vehicle spanning the same over its entire width, rails on said elevator having a contour coinciding substantially with the profile of a grade to be cut including paths of travel for the vehicle supports, a carrier equipped with earth-cutting and elevating mechanism arranged for travel on said rails, a mechanism for operating said elevator, mechanism for effecting forced travel of said carrier on said rails, and an engine on the carrier for actuating said earth-cutting and elevating mechanism, the latter being disposed forward of the vehicle supports and adapted to cut paths of travel for the latter.

20. A grading machine including a vehicle, a member spanning the same, mechanism for manipulating said member to raise and lower the end portions thereof simultaneously or independently of each other, an excavating mechanism supported upon the said member for travel thereon from side to side of the said vehicle, rails mounted on said member to carry the last-named mechanism and being interchangeable with other rails for guiding said mechanism in a path of travel corresponding substantially with the lateral contour of the grade to be cut, an engine for actuating said excavating mechanism, means for effecting travel of the latter on said member, and a second engine for propelling said vehicle and said means.

21. A grading machine including a vehicle, a member spanning the same, mechanism for manipulating said member to raise and lower the end portions thereof simultaneously or independently of each other and raising or lowering the respective front and rear portions thereof selectively, a tiltable excavating mechanism supported upon said member for travel thereon from side to side of said vehicle, means rigidly mounted on the latter and acting independently of the first-named mechanism to effect tilting of said excavating mechanism during travel thereof on said member for causing the same to cut a grade of predetermined profile, an engine for actuating said excavating mechanism, means for effecting travel of the latter on said actuating member, and a second engine for propelling said vehicle and said means.

22. A grading machine including a vehicle equipped with traction members adapted to be caused to travel in predetermined paths at the sides of a predetermined grade to be cut, an excavating mechanism arranged to cut said paths and said grade in advance of the vehicle, a runway spanning the latter and supporting the said mechanism, means operable to raise and lower opposite end portions of the said runway in unison or independently of each other and operable also to raise and lower the front and rear portions of said runway independently of each other for varying the zone of action of said mechanism relatively to the path of travel of the traction members of the vehicle with respect to said predetermined paths, interchangeable guide means on said runway for guiding said mechanism to cause the same to cut a grade of predetermined profile, and engine for actuating said mechanism, an engine for propelling said vehicle, mechanism actuated by the last-mentioned engine for causing said excavating mechanism to travel from end to end of said runway, and manually controlled means for causing the last-mentioned engine to propel said vehicle and the said last-mentioned mechanism selectively.

23. A grading machine including a vehicle frame arranged to span a grade to be formed, traction means at the sides of said frame supporting the latter and arranged for travel over the marginal portions of said grade, an excavating mechanism supported upon the said frame and projecting forward and spaced from said traction means to cut said grade in advance of the latter and said frame, a runway equipped with interchangeable guide rails mounted on said frame and extending transversely of the direction of travel of the vehicle, means on said frame for varying the elevation of said runway and cant the same laterally and longitudinally at will to vary the zone of earth cutting action of the said mechanism to correspond with the lateral profile of the grade to be formed and relatively to the elevation of the said traction means during travel of the said mechanism on said runway, an engine for propelling said vehicle, mechanism connected with said engine and said excavating mechanism for causing the latter to travel on said runway, an engine for actuating the said excavating mechanism, and manually controlled means on said frame geared to the first-named engine for adjusting the elevation and position of said runway during the travel of the machine.

24. A grading machine including a vehicle frame arranged to span a grade to be formed, traction means at the sides of said frame supporting the latter and arranged for travel over the marginal portions of said grade, an excavating mechanism supported upon and projecting forwardly of the said frame and for cutting said grade in advance of the said traction means and said frame, a manually manipulable member on said frame on which said mechanism travels for varying the zone of action of the same relatively to the traction means by raising, lowering and canting said member laterally and longitudinally during travel of the vehicle, devices rigid with said member for guiding the same additionally to the adjustments of said member, an engine for propelling said vehicle, mechanism connected with said engine and said excavating mechanism for causing the latter to travel on said frame, and an engine for actuating the said excavating mechanism.

25. An excavating machine including a vehicle, a tiltable elevator mounted thereon and spanning the same from side to side, manually controlled mechanism for raising, lowering and tilting the said elevator, a unitary continuously operating earth excavating and elevating mechanism, including an engine for actuating the same, mounted on said elevator for travel thereon transversely of the direction of travel of the vehicle, an engine for propelling the vehicle, mechanism driven by said last-named engine for causing said excavating mechanism to travel reciprocably over said elevator and for actuating said first-named mechanism.

26. An excavating machine including a vehicle, a tiltable elevator mounted thereon and spanning the same from side to side, mechanism for raising and lowering and tilting the said elevator, rails on said elevator presenting crowns shaped to correspond substantially with the lateral contour of the grade to be formed, a unitary excavating mechanism, including an engine for actuating the same, mounted upon the rails of said elevator for travel thereon, an engine for propelling the vehicle, and mechanism driven by said engine for causing said excavating mechanism to travel reciprocably over said elevator.

27. A grading machine comprising a vehicle, a carrier frame extending laterally of said vehicle, a unitary continuously operating excavating and earth elevating mechanism including an engine actuating the same mounted for travel on said carrier frame and arranged to cut a predetermined length of grade while the vehicle is at rest, mechanism for causing the excavating mechanisms while in operation to travel on said carrier frame, means on said carrier frame for determining the lateral contour of the grade cut by said excavating mechanism in travel thereon, and means for vertically adjusting the position of the carrier frame at either end thereof and at rear and front selectively independently of the other or simultaneously at both ends thereof relatively to the vehicle for determining the level and lateral contour of the grade cut by said excavating mechanism in travel thereof.

28. A machine of the type specified including a power propelled vehicle, a unitary earth excavating and elevating mechanism having a path of travel describing substantially a triangle having a horizontal base, a support for said mechanism spanning the vehicle frame and equipped with interchangeable rails upon which said mechanism is adapted to travel for causing said mechanism to travel in a lateral path coincident with the predetermined lateral contour of the grade to be cut, means for adjusting said support vertically at either or both ends thereof, an engine for actuating said mechanism independently of the vehicle, and power actuated manually controlled means for causing said mechanism to travel on said support while in operation.

29. A machine of the kind specified comprising a vehicle, a runway extending from side to side thereof, a constantly operating conveyor extending parallel with and spaced from said runway for discharging loose earth beyond one side of the vehicle, a carriage mounted for travel on said runway, a continuously operating earth excavating and elevating mechanism mounted on said carriage, an actuating engine for said mechanism mounted on said carriage, a strike-off blade mounted on the vehicle rearwardly of and spaced from the zone of earth cutting action of said mechanism, a chute on said carriage into which said mechanism discharges elevated earth, and manually manipulable means within said chute for causing said earth to be delivered to said conveyor or into the space between said blade and the said earth cutting zone or partly to both.

30. A machine of the type specified including a vehicle, an earth excavating and elevating mechanism, a vertically adjustable support for the latter upon which the same is adapted to travel laterally of the direction of travel of the vehicle, a chute carried by said mechanism into which the latter delivers earth, a laterally traveling conveyor belt disposed below said chute, a trough on said mechanism disposed angularly below said chute and adapted to receive earth from the latter and deliver the same upon the grade behind said mechanism, and an adjustable means within said chute arranged to be positioned to cause earth delivered into the latter to be discharged in whole or in part upon the conveyor belt or to said trough.

31. A machine of the type specified including a vehicle, an earth excavating and elevating mechanism, a vertically adjustable support for the latter upon which the same is adapted to travel laterally of the direction of travel of the vehicle, a chute carried by said mechanism into which the latter delivers earth, a laterally traveling conveyor belt disposed below said chute, a trough on said mechanism disposed angularly below said chute and adapted to receive earth from the latter and deliver the same upon the grade behind said mechanism, and an adjustable means within said chute arranged to be positioned to cause earth delivered into the latter to be discharged in whole or in part upon the conveyor belt or to said trough, and a strike-off plate connected with said support and disposed for striking off earth discharged from said trough to a predetermined level relatively to the cutting zone of said mechanism.

32. A machine of the type specified including a vehicle, an earth excavating and elevating mechanism, a vertically adjustable support for the latter upon which the same is adapted to travel laterally of the direction of travel of the vehicle, a chute carried by said mechanism into which the latter delivers earth, a laterally traveling conveyor belt disposed below said chute, a trough on said mechanism disposed angularly below said chute and adapted to receive earth from the latter and deliver the same upon the grade behind said mechanism, and an adjustable means within said chute arranged to be positioned to cause earth delivered into the latter to be discharged in whole or in part upon the conveyor belt or to said trough, and a vertically adjustable strike-off plate connected with said support for vertical movement coincidentally with the latter and disposed for striking off earth discharged from said trough to a predetermined level relatively to the cutting zone of said mechanism.

33. In a machine of the type specified, including a vehicle, a unitary continuously operating earth excavating and elevating mechanism including an engine for actuating the same, a vertically adjustable support for the latter upon which the same is adapted to travel laterally of the direction of travel of the vehicle, vertically adjustable guide devices mounted upon said support and adapted to cooperate with guide means disposed along opposite sides of and parallel with a predetermined path of travel of the vehicle for controlling vertically the zone of excavation of said mechanism to accord with the positions of said guide means, manually controlled power actuated mechanisms for raising and lowering said support at either or both ends thereof selectively for maintaining said guide devices in register with said guide means, and mechanism for selectively effecting lateral travel of said excavating mechanism upon said support alternately in opposite directions automatically or responsively to manual control.

34. A machine of the type specified including a vehicle, an earth excavating and elevating mechanism, a vertically adjustable support for the latter upon which the same is adapted to travel laterally of the direction of travel of the vehicle, earth receiving means associated with said mechanism for selectively delivering excavated earth to one side of the path of travel of the vehicle or back upon the grade in front of the vehicle and behind the cutting zone of said mechanism, and a strike off plate connected with said support and disposed for striking off earth discharged upon the grade from said receiving means to a predetermined level relatively to the cutting zone of said mechanism.

35. A machine of the type specified including a vehicle, an earth excavating and elevating mechanism, a vertically adjustable support for the latter upon which the same is adapted to travel laterally of the direction of travel of the vehicle, earth receiving means associated with said mechanism for selectively delivering excavated earth to one side of the path of travel of the vehicle or back upon the grade in front of the vehicle and behind the cutting zone of said mechanism, manually operable means for controlling the direction of delivery of said earth, a device disposed for striking off earth discharged from said trough to a predetermined level relatively to the cutting zone of said mechanism.

36. In a machine of the type specified, a vehicle, an elevator thereon, a carriage mounted on said elevator for travel laterally of the direction of travel of the vehicle, an earth excavating and transporting mechanism and an engine for actuating same mounted on said carriage, two independently operable spaced apart jacks mounted upon each side of the vehicle and supporting said elevator, an engine on the vehicle frame for propelling the same, manually controlled gearing between said last-named engine and said jacks for actuating the latter, gearing between said last-named engine and said carriage for propelling the latter, and means automatically controlling said last-named gearing and manually operable at will for controlling the length of travel of said carriage.

37. In a machine of the type specified, a vehicle, an elevator thereon, a carriage mounted on said elevator for travel laterally of the direction of travel of the vehicle, an earth excavating and transporting mechanism and an engine for actuating same mounted on said carriage, two independently operable spaced apart jacks mounted upon each side of the vehicle and supporting said elevator, an engine on the vehicle frame for propelling the same, manually controlled gearing between said last-named engine and said jacks for actuating the latter, gearing between said last-named engine and said carriage for propelling the latter, and means automatically controlling said last-named gearing and manually operable at will for controlling the length of travel of said carriage, and adjustable guide devices mounted on the elevator at both sides and at front and rear of the latter arranged for cooperation with guide cords at the sides of a grade to be cut for guiding the operators in the actuation of the said several jacks.

38. In a machine of the type specified, a vehicle, an elevator mounted thereon, a carriage mounted for travel laterally of the direction of travel of the vehicle, an earth excavating and transporting mechanism and an engine for actuating same mounted on said carriage, two independently operable spaced apart jacks mounted upon each side of the vehicle and supporting said elevator, an engine on the vehicle for propelling the same, manually controlled gearing between said last-named engine and said jacks for actuating the latter, gearing between said last-named engine and said carriage for propelling the latter, and means automatically controlling said last-named gearing and manually operable at will for controlling the length of travel of said carriage, adjustable guide devices mounted on the elevator at both sides and at front and rear of the latter arranged for cooperation with guide cords at the sides of a grade to be cut for guiding the operators in the actuation of the said several jacks, and an adjustable guide device at one side of the machine adapted to be disposed over one of said guide cords for guiding one of the operators in effecting steering of the vehicle.

39. A machine of the type specified including a vehicle equipped with traction members adapted to travel in paths disposed along the marginal portions of a grade to be cut, a power actuated earth excavating unit supported upon and adapted for travel laterally of the direction of travel of the vehicle over a width sufficient to cut a grade in advance of the vehicle extending beyond the paths of travel of said traction members, an engine for propelling the vehicle independently of the operation of said unit, mechanism actuated by said engine for effecting travel of said unit upon the vehicle while the latter is in motion or at rest, means associated with said mechanism and said unit for effecting automatic alternate travel of said unit in respectively opposite directions, and adjustable devices associated with said last-named means for varying the zone of travel of said unit.

40. A machine of the type specified including a vehicle equipped with traction members adapted to travel in paths disposed along the marginal portions of a grade to be cut, a power actuated earth excavating unit supported upon and adapted for travel laterally of the direction of travel of the vehicle over a width sufficient to cut a grade in advance of the vehicle extending beyond the paths of travel of said traction members, an engine for propelling the vehicle independently of the operation of said unit, mechanism actuated by said engine for effecting travel of said unit upon the vehicle while the latter is in motion or at rest, means associated with said mechanism and said unit for effecting automatic alternate travel of said unit in respectively opposite directions, manually operable means for arresting travel of said unit at any selected point, and adjustable devices associated with said last-named means for varying the zone of travel of said unit.

41. A machine of the type specified including a vehicle equipped with traction members adapted to travel in paths disposed along the marginal portions of a grade to be cut, a power actuated earth excavating unit supported upon and adapted for travel laterally of the direction of travel of the vehicle over a width sufficient to cut a grade in advance of the vehicle extending beyond the paths of travel of said traction members, an engine for propelling the vehicle independently of the operation of said unit, mechanism actuated by said engine for effecting travel of said unit upon the vehicle while the latter is in motion or at rest, means associated with said mechanism and said unit for effecting automatic alternate travel of said unit in respective opposite directions, said means being also manually operable to reverse the travel of said unit at any point in its automatically controlled travel, and adjustable devices associated with said last-named means for varying the zone of travel of said unit.

42. A machine of the type specified including a vehicle equipped with traction members adapted to travel in paths disposed along the marginal portions of a grade to be cut, a power actuated earth excavating unit supported upon and adapted for travel laterally of the direction of travel of the vehicle over a width sufficient to cut a grade in advance of the vehicle extending beyond the paths of travel of said traction members, an engine for propelling the vehicle independently of the operation of said unit, mechanism actuated by said engine for effecting travel of said unit upon the vehicle while the latter is in motion or at rest, means associated with said mechanism and said unit for effecting automatic alternate travel of said unit in respectively opposite directions, said means being also manually operable to reverse the travel of said unit at any point in its automatically controlled travel, manually operable means for arresting travel of said unit at any selected point, and adjustable devices associated with said last-named means for varying the zone of travel of said unit.

43. An excavating machine comprising a power propelled vehicle equipped with a power actuated laterally traveling earth conveying mechanism, a power actuated excavating mechanism supported and adapted to travel on said vehicle laterally of the direction of travel of the latter and arranged to excavate earth over a lataeral path in advance of the vehicle, manually controlled means for causing said unit to deliver excavated earth in whole or in part to said conveying mechanism or back upon an area behind the zone of excavation of said unit, a strike-off member on the vehicle for controlling the depth of said earth deposited upon the last-named area, and power actuated means for effecting lateral travel of said unit.

44. An excavating machine comprising a power propelled vehicle equipped with a power actuated laterally traveling earth conveying mechanism, a power actuated excavating mechanism supported and adapted to travel on said vehicle laterally of the direction of travel of the latter and arranged to excavate earth over a lateral path in advance of the vehicle, manually controlled means for causing said unit to deliver excavated earth in whole or in part to said conveying mechanism or back upon an area behind the zone of excavation of said unit, a strike-off member on the vehicle for controlling the depth of said earth deposited upon the last-named area, power actuated means for effecting lateral travel of said unit and manually operable means controlling travel of said vehicle and said unit each independently of the other.

45. A machine of the type specified comprising a vehicle frame equipped with traction devices disposed inwardly of the side edges of said frame, a runway extending over the entire width of said frame, a carriage mounted for travel over the entire length of said runway, a continuously operating earth excavating and elevating mechanism and an engine for actuating the same mounted on said carriage, manually controlled power actuated jacks upon which the four corner portions of said runway are carried, said jacks being operable in unison and independently of each other to raise and lower said runway and for tilting the same laterally and longitudinally for controlling the depth of cut effected by said mechanism at all points in its travel over the runway while the vehicle is in motion or at rest, and while said carriage is at rest during travel of the vehicle, means mounted upon the runway at the ends thereof for cooperation with guide lines disposed parallel with and elevated above the predetermined grade to be cut and at opposite sides of said grade for guiding operators in manipulating said jacks, said excavating mechanism having a length of earth cutting travel adapted to cut a grade of appreciable length extending from side to side of the proposed grade, an engine for propelling the vehicle and propelling said carriage in unison at predetermined respective speeds so proportioned to each other that each lateral path cut by said excavating mechanism is of greater length than the length of travel of the vehicle during the same period, and means associated with said carriage and said last-named engine for automatically reversing the travel of said carriage as the latter attains a predetermined limit of travel along said runway.

ALFRED W. FRENCH.